US012663397B2

(12) United States Patent
Zhang et al.

(10) Patent No.: US 12,663,397 B2
(45) Date of Patent: Jun. 23, 2026

(54) COATED ELECTRODE, ELECTROCHEMICAL SENSOR AND METHOD FOR DETECTION OF HYDROGEN PEROXIDE

(71) Applicant: The Board of Trustees of the University of Illinois, Urbana, IL (US)

(72) Inventors: Yingjie Zhang, Savoy, IL (US); Fujia Zhao, Urbana, IL (US)

(73) Assignee: THE BOARD OF TRUSTEES OF THE UNIVERSITY OF ILLINOIS, Urbana, IL (US)

( * ) Notice: Subject to any disclaimer, the term of this patent is extended or adjusted under 35 U.S.C. 154(b) by 560 days.

(21) Appl. No.: 17/983,052

(22) Filed: Nov. 8, 2022

(65) Prior Publication Data

US 2023/0141805 A1 May 11, 2023

Related U.S. Application Data

(60) Provisional application No. 63/278,313, filed on Nov. 11, 2021.

(51) Int. Cl.
*G01N 27/327* (2006.01)

(52) U.S. Cl.
CPC ................................. *G01N 27/3277* (2013.01)

(58) Field of Classification Search
CPC ... G01N 27/3277; G01N 27/302; G01N 27/30
See application file for complete search history.

(56) References Cited

FOREIGN PATENT DOCUMENTS

| WO | WO 1999/053301 A1 | 10/1999 |
| WO | WO 2014/146020 A2 | 9/2014 |
| WO | WO 2014/159193 A1 | 10/2014 |
| WO | WO 2018/223760 A1 | 12/2018 |
| WO | WO 2019/015359 A1 | 1/2019 |

OTHER PUBLICATIONS

Dutta et al., "Single source precursor approach to the synthesis of Bi2S3 nanoparticles: A new amperometric hydrogen peroxide biosensor," 2013, Sensors and Actuators B: Chemical, vol. 192, pp. 578-585 (Year: 2013).*
Patella et al., "A nanostructured sensor of hydrogen peroxide," 2017, Sensors and Actuators B: Chemical, vol. 245, pp. 44-54 (Year: 2017).*

(Continued)

*Primary Examiner* — Shizhi Qian
(74) *Attorney, Agent, or Firm* — Crowell & Moring LLP

(57) ABSTRACT

An electrochemical method for detecting hydrogen peroxide includes providing an electrochemical sensor comprising: a container holding an electrolyte; a coated electrode positioned in the container; and a counter electrode spaced apart from the coated electrode in the container, where the coated electrode includes a conductive substrate and a coating comprising a topological insulator on the conductive substrate. A voltage is applied to the coated electrode and the counter electrode, and a biological specimen is added to the electrolyte to form an analyte solution. Current density is measured. An increase in the current density upon forming the analyte solution indicates presence of hydrogen peroxide in the biological specimen.

14 Claims, 8 Drawing Sheets

(56)                    References Cited

OTHER PUBLICATIONS

Li et al., "Nano-Bismuth-Sulfide for Advanced Optoelectronics," 2022, Photonics, vol. 9, pp. 1-23 (Year: 2022).*

Fisherbrand, "Plastic Transfer Pipettes," accessed 2025, Fisher Scientific, pp. 1-2 (Year: 2025).*

Nwose et al., "Influence of Anticoagulants on Determination of H2O2 Levels in Blood: Comparison of Citrate and EDTA," 2018, International Journal of Pathology and Clinical Research, vol. 4, pp. 1-5 (Year: 2018).*

Wu et al., "A high-sensitive and fast fabricated glucose biosensor based on Prussian blue/topological insulator Bi2Se3 hybrid film," 2012, Biosensors and Bioelectronics, vol. 38, pp. 289-294 (Year: 2012).*

Ahmed et al., "Growth, morphology and crystal structure of electrodeposited Bi2Se3 films: Influence of the substrate," 2019, Electrochimica Acta, vol. 299, pp. 654-662 (Year: 2019).*

Park et al., "Molecular beam epitaxial growth and electronic transport properties of high quality topological insulator Bi2Se3 thin films on hexagonal boron nitride," 2016, 2D Materials, vol. 3, pp. 1-8 (Year: 2016).*

Zhang et al., "Catalytic topological insulator Bi2Se3 nanoparticles for in vivo protection against ionizing radiation," 2017, Nanomedicine: Nanotechnology, Biology, and Medicine, vol. 13, pp. 1597-1605 (Year: 2017).*

Chen et al., Study on the electrochemical catalytic properties of the topological insulator Bi2Se3, Biosensors and Bioelectronics, 2013, 46, 171-174 (Year: 2013).*

Xiao et al., Colorimetric Biosensor for Detection of Cancer Biomarker by Au Nanoparticle-Decorated Bi2Se3 Nanosheets, ACS Applied Materials & Interfaces, 2017, 9, 6931-6940 (Year: 2017).*

Chen, D.; Pang, D.; Zhang, S.; Song, H.; Zhu, W.; Zhu, J. Synergistic Coupling of $NiCo_2O_4$ Nanorods onto Porous $Co_3O_4$ Nanosheet Surface for Tri-Functional Glucose, Hydrogen-Peroxide Sensors and Supercapacitor. *Electrochim. Acta* 2020, 330, 135326.

Chen, H.; Zhu, W.; Xiao, D.; Zhang, Z. CO Oxidation Facilitated by Robust Surface States on Au-Covered Topological Insulators. *Phys. Rev. Lett.* 2011, 107, 56804.

Chen, S.; Fang, Y.- M.; Li, J.; Sun, J.-J.; Chen, G.-N.; Yang, H.-H. Study on the Electrochemical Catalytic Properties of the Topological Insulator $Bi_2Se_3$. *Biosens. Bioelectron.* 2013, 46, 171-174.

Chen, W.; Cai, S.; Ren, Q.-Q.; Wen, W.; Zhao, Y.-D. Recent Advances in Electrochemical Sensing for Hydrogen Peroxide: A Review. *Analyst* 2012, 137, 49-58.

Dang, W.; Sun, Y.; Jiao, H.; Xu, L.; Lin, M. AuNPs-$NH_2$/Cu-MOF Modified Glassy Carbon Electrode as Enzyme-Free Electrochemical Sensor Detecting $H_2O_2$. *J. Electroanal. Chem.* 2020, 856, 113592.

Dong, S.; Li, M.; Wei, W.; Liu, D.; Huang, T. An Convenient Strategy for IgG Electrochemical Immunosensor: The Platform of Topological Insulator Materials $Bi_2Se_3$ and Ionic Liquid. *J. Solid State Electrochem.* 2017, 21, 793-801.

Dong, S.; Xi, J.; Wu, Y.; Liu, H.; Fu, C.; Liu, H.; Xiao, F. High Loading $MnO_2$ Nanowires on Graphene Paper: Facile Electrochemical Synthesis and Use as Flexible Electrode for Tracking Hydrogen Peroxide Secretion in Live Cells. *Anal. Chim. Acta* 2015, 853, 200-206.

Dong, S.; Yang, Q.; Peng, L.; Fang, Y.; Huang, T. Dendritic Ag@Cu Bimetallic Interface for Enhanced Electrochemical Responses on Glucose and Hydrogen Peroxide. *Sensors Actuators, B Chem.* 2016, 232, 375-382.

Giorgio, M.; Trinei, M.; Migliaccio, E.; Pelicci, P. G. Hydrogen Peroxide: A Metabolic by-Product or a Common Mediator of Ageing Signals? *Nat. Rev. Mol. Cell Biol.* 2007, 8, 722-728.

He et al., Non-enzymatic hydrogen peroxide electrochemical sensor based on a three-dimensional $MnO_2$ nanosheets/carbon foam composite, *Royal Society of Chemistry Advances*, 2014, 4, 49315-49323 (Abstract only).

Li, C.; Wu, R.; Zou, J.; Zhang, T.; Zhang, S.; Zhang, Z.; Hu, X.; Yan, Y.; Ling, X. MNPs@anionic MOFs/ERGO with the Size Selectivity for the Electrochemical Determination of $H_2O_2$ Released from Living Cells. *Biosens. Bioelectron.* 2018, 116, 81-88.

Li, G.; Felser, C. Heterogeneous Catalysis at the Surface of Topological Materials. *Appl. Phys. Lett.* 2020, 116, 70501.

Li, G.; Fu, C.; Shi, W.; Jiao, L.; Wu, J.; Yang, Q.; Saha, R.; Kamminga, M. E.; Srivastava, A. K.; Liu, E.; et al. Dirac Nodal Arc Semimetal PtSn4: An Ideal Platform for Understanding Surface Properties and Catalysis for Hydrogen Evolution. *Angew. Chemie Int. Ed.* 2019, 58, 13107-13112.

Li, G.; Xu, Q.; Shi, W.; Fu, C.; Jiao, L.; Kamminga, M. E.; Yu, M.; Tüysüz, H.; Kumar, N.; Süß, V.; et al. Surface States in Bulk Single Crystal of Topological Semimetal $Co_3Sn_2S_2$ toward Water Oxidation. *Sci. Adv.* 2019, 5, eaaw9867.

Li, J.; Ma, H.; Xie, Q.; Feng, S.; Ullah, S.; Li, R.; Dong, J.; Li, D.; Li, Y.; Chen, X.-Q. Topological Quantum Catalyst: Dirac Nodal Line States and a Potential Electrocatalyst of Hydrogen Evolution in the TiSi Family. *Sci. China Mater.* 2018, 61, 23-29.

Li, L.; Zeng, J.; Qin, W.; Cui, P.; Zhang, Z. Tuning the Hydrogen Activation Reactivity on Topological Insulator Heterostructures. *Nano Energy* 2019, 58, 40-46.

Li, X.; Du, X. Molybdenum Disulfide Nanosheets Supported Au—Pd Bimetallic Nanoparticles for Non-Enzymatic Electrochemical Sensing of Hydrogen Peroxide and Glucose. *Sensors Actuators, B Chem.* 2017, 239, 536-543.

Li, Y.; Zhang, P.; Ouyang, Z.; Zhang, M.; Lin, Z.; Li, J.; Su, Z.; Wei, G. Nanoscale Graphene Doped with Highly Dispersed Silver Nanoparticles: Quick Synthesis, Facile Fabrication of 3D Membrane-Modified Electrode, and Super Performance for Electrochemical Sensing. *Adv. Funct. Mater.* 2016, 26, 2122-2134.

Liu, J.; Bo, X.; Zhao, Z.; Guo, L. Highly Exposed Pt Nanoparticles Supported on Porous Graphene for Electrochemical Detection of Hydrogen Peroxide in Living Cells. *Biosens. Bioelectron.* 2015, 74, 71-77.

Liu, M.; Liu, R.; Chen, W. Graphene Wrapped $Cu_2O$ Nanocubes: Non-Enzymatic Electrochemical Sensors for the Detection of Glucose and Hydrogen Peroxide with Enhanced Stability. *Biosens. Bioelectron.* 2013, 45, 206-212.

López-Lázaro, M. Dual Role of Hydrogen Peroxide in Cancer: Possible Relevance to Cancer Chemoprevention and Therapy. *Cancer Lett.* 2007, 252, 1-8.

Mai, L. N. T.; Bui, Q. B.; Bach, L. G.; Nhac-Vu, H. T. A Novel Nanohybrid of Cobalt Oxide-Sulfide Nanosheets Deposited Three-Dimensional Foam as Efficient Sensor for Hydrogen Peroxide Detection. *J. Electroanal. Chem.* 2020, 857, 113757.

Matsuda, H.; Ayabe, Y. Zur Theorie Der Randles-Sevčikschen Kathodenstrahl-Polarographie. *Zeitschrift für Elektrochemie, Berichte der Bunsengesellschaft für Phys. Chemie* 1955, 59, 494-503.

Mei, H.; Wu, H.; Wu, W.; Wang, S.; Xia, Q. Ultrasensitive Electrochemical Assay of Hydrogen Peroxide and Glucose Based on PtNi Alloy Decorated MWCNTs. *RSC Adv.* 2015, 5, 102877-102884.

Meier, J. et al., Hydrogen Peroxide Sensors for Biomedical Applications, *Chemosensors* 2019, 7, 64, 1-11.

Memmel, N.; Bertel, E. Role of Surface States for the Epitaxial Growth on Metal Surfaces. *Phys. Rev. Lett.* 1995, 75, 485-488.

Mills, R. Self-Diffusion in Normal and Heavy Water in the Range 1-45.Deg. *J. Phys. Chem.* 1973, 77, 685-688.

Qu, Q.; Liu, B.; Liang, J.; Li, H.; Wang, J.; Pan, D.; Sou, I. K. Expediting Hydrogen Evolution through Topological Surface States on $Bi_2Te_3$. *ACS Catal.* 2020, 10, 2656-2666.

Rajaiji et al., Bismuth telluride decorated on graphitic carbon nitrides based binary nanosheets: Its application in electrochemical determination of salbutamol (feed additive) in meat samples. *Journal of Hazardous Materials*, 2021, 413, 1-15.

Rajamathi, C. R.; Gupta, U.; Kumar, N.; Yang, H.; Sun, Y.; Süß, V.; Shekhar, C.; Schmidt, M.; Blumtritt, H.; Werner, P.; et al. Weyl Semimetals as Hydrogen Evolution Catalysts. *Adv. Mater.* 2017, 29, 1606202.

Rhee, S. G.; Woo, H. A. Multiple Functions of Peroxiredoxins: Peroxidases, Sensors and Regulators of the Intracellular Messenger $H_2O_2$, and Protein Chaperones. *Antioxid. Redox Signal.* 2010, 15, 781-794.

(56)  References Cited

OTHER PUBLICATIONS

Rhee, S. G.; Woo, H. A.; Kil, I. S.; Bae, S. H. Peroxiredoxin Functions as a Peroxidase and a Regulator and Sensor of Local Peroxides. *J. Biol. Chem.* 2012, 287, 4403-4410.

Salimi, A.; Hallaj, R.; Soltanian, S. Fabrication of a Sensitive Cholesterol Biosensor Based on Cobalt-Oxide Nanostructures Electrodeposited onto Glassy Carbon Electrode. *Electroanalysis* 2009, 21, 2693-2700.

Shu, Y.; Zhang, W.; Cai, H.; Yang, Y.; Yu, X.; Gao, Q. Expanding the Interlayers of Molybdenum Disulfide toward the Highly Sensitive Sensing of Hydrogen Peroxide. *Nanoscale* 2019, 11, 6644-6653.

Sies, H. Role of Metabolic $H_2O_2$ Generation: Redox Signaling and Oxidative Stress. *J. Biol. Chem.* 2014, 289, 8735-8741.

Song, H.; Ni, Y.; Kokot, S. Investigations of an Electrochemical Platform Based on the Layered $MoS_2$-Graphene and Horseradish Peroxidase Nanocomposite for Direct Electrochemistry and Electrocatalysis. *Biosens. Bioelectron.* 2014, 56, 137-143.

Tatsuma, T.; Ogawa, T.; Sato, R.; Oyama, N. Peroxidase-Incorporated Sulfonated Polyaniline-Polycation Complexes for Electrochemical Sensing of $H_2O_2$. *J. Electroanal. Chem.* 2001, 501, 180-185.

Veal, E. A.; Day, A. M.; Morgan, B. A. Hydrogen Peroxide Sensing and Signaling. *Mol. Cell* 2007, 26, 1-14.

Vergniory, M. G.; Elcoro, L.; Felser, C.; Regnault, N.; Bernevig, B. A.; Wang, Z. A Complete Catalogue of High-Quality Topological Materials. *Nature* 2019, 566, 480-485.

Wu, S.; Liu, G.; Li, P.; Liu, H.; Xu, H. A High-Sensitive and Fast-Fabricated Glucose Biosensor Based on Prussian Blue/ Topological Insulator $Bi_2Se_3$ Hybrid Film. *Biosens. Bioelectron.* 2012, 38, 289-294.

Xue, B.; Li, K.; Gu, S.; Zhang, L.; Lu, J. Ni Foam-Supported ZnO Nanowires and $Co_3$ $O_4/NiCo_2O_4$ Double-Shelled Nanocages for Efficient Hydrogen Peroxide Detection. *Sensors Actuators, B Chem.* 2018, 262, 828-836.

Yang, B.; Chen, Y.; Shi, J. Reactive Oxygen Species (ROS)-Based Nanomedicine. *Chem. Rev.* 2019, 119, 4881-4985.

Yang, Q.; Li, G.; Manna, K.; Fan, F.; Felser, C.; Sun, Y. Topological Engineering of Pt-Group-Metal-Based Chiral Crystals toward High-Efficiency Hydrogen Evolution Catalysts. *Adv. Mater.* 2020, 32, 1908518.

Zhang, N.; Zheng, F.; Huang, B.; Ji, Y.; Shao, Q.; Li, Y.; Xiao, X.; Huang, X. Exploring $Bi_2Te_3$ Nanoplates as Versatile Catalysts for Electrochemical Reduction of Small Molecules. *Adv. Mater.* 2020, 32, 1906477.

Zhu, L.; Zhang, Y.; Xu, P.; Wen, W.; Li, X.; Xu, J. PtW/$MoS_2$ Hybrid Nanocomposite for Electrochemical Sensing of $H_2O_2$ Released from Living Cells. *Biosens. Bioelectron.* 2016, 80, 601-606.

* cited by examiner

COATED ELECTRODE, ELECTROCHEMICAL SENSOR AND METHOD FOR DETECTION OF HYDROGEN PEROXIDE

RELATED APPLICATION

The present patent document claims the benefit of priority to U.S. Provisional Patent Application No. 63/278,313, which was filed on Nov. 11, 2021, and is hereby incorporated by reference in its entirety.

TECHNICAL FIELD

The present disclosure is related generally to electrochemistry, and more particularly to an electrochemical sensor for detection of hydrogen peroxide.

BACKGROUND

Hydrogen peroxide ($H_2O_2$) is an important chemical not only for industrial and everyday use as bleaches and disinfectants, but also for regulating various metabolisms in biological systems such as cellular signaling, oxidative stress, aging, and cancer growth. All of these biological functions depend sensitively on the intracellular concentration of $H_2O_2$, which typically ranges from 10 nM to 1 μM. Therefore, sensitive detection of $H_2O_2$ in the nano- to micro-molar range is critical for health monitoring and disease diagnosis. While enzyme-based electrochemical sensors have been developed and clinically used for $H_2O_2$ detection, their high cost and low thermal and chemical stability limit their large-scale production and diagnostic applications. Therefore, tremendous efforts have been devoted to developing inorganic electrocatalysts for $H_2O_2$ detection in the past few years. However, existing enzyme-free electrochemical sensors either require expensive precious metals or have limited sensitivity. Therefore, development of a low-cost and highly sensitive $H_2O_2$ electrochemical sensor would be beneficial.

BRIEF SUMMARY

A coated electrode for in vitro detection of hydrogen peroxide includes a conductive substrate and a coating comprising a topological insulator on the conductive substrate.

An electrochemical method for detecting hydrogen peroxide includes providing an electrochemical sensor comprising: a container holding an electrolyte; a coated electrode positioned in the container; and a counter electrode spaced apart from the coated electrode in the container, where the coated electrode includes a conductive substrate and a coating comprising a topological insulator on the conductive substrate. A voltage is applied to the coated electrode and the counter electrode, and a biological specimen is added to the electrolyte to form an analyte solution. Current density is measured. An increase in the current density upon forming the analyte solution indicates presence of hydrogen peroxide in the biological specimen.

A method of making a coated electrode for electrochemical detection of hydrogen peroxide includes: depositing a coating solution comprising flakes dispersed in a liquid onto a conductive substrate, the flakes comprising a topological insulator; and drying the conductive substrate to evaporate the liquid, whereby the flakes form a coating on the conductive substrate.

BRIEF DESCRIPTION OF THE DRAWINGS

FIG. 5D shows a Nyquist plot of the EIS measurement of 100 μM $H_2O_2$ in 0.1 M $K_2SO_4$ solution, at a potential of 0.066 V vs RHE; the obtained values of the equivalent circuit elements are $R_{ct}$=3.3 kΩ 12 $cm^2$, Q=737.7 μF/$cm^2$ and phase factor n=0.724 in.

DETAILED DESCRIPTION

Described in this disclosure is the application of topological materials to electrochemical sensing. Topological materials, including topological insulators and topological semimetals, are systems where strong spin-orbit coupling induces band inversion in the bulk and delocalized, topologically protected states on the surface. The inventors have recognized that attributes of these materials previously exploited for catalysis, such as highly mobile surface states that can facilitate interfacial charge transfer, and topological protection that can minimize current noise induced by parasitic surface modifications, may be beneficial in electrochemical sensing, e.g., by enhancing the signal-to-noise ratio of the sensing current. Given this recognition, a coated electrode for in vitro detection of hydrogen peroxide, an electrochemical sensor, and a method of detecting $H_2O_2$ that utilize topological materials have been developed.

Figure 1A:
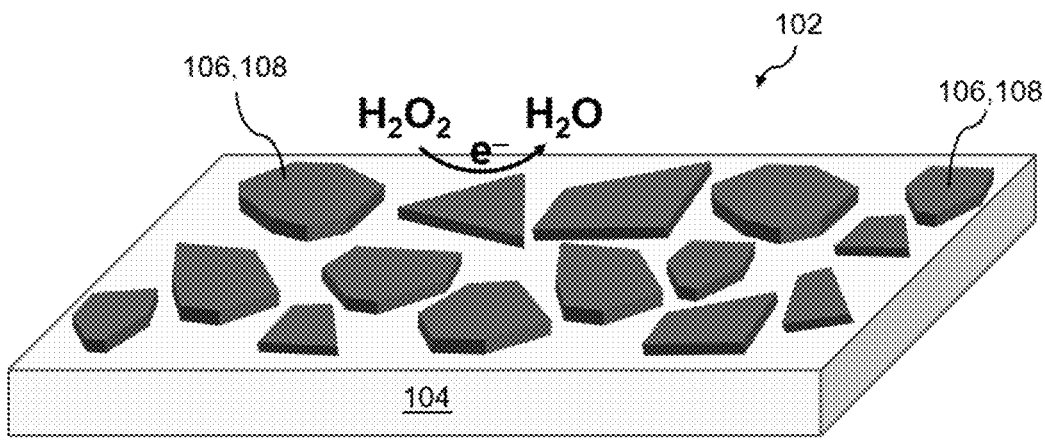
FIG. 1A shows a coated electrode that includes a coating comprising a topological insulator on a conductive substrate.

Referring to FIG. 1A, the coated electrode 102 includes a conductive substrate 104 and a coating 106 comprising a topological insulator on the conductive substrate 104. The topological insulator may exhibit van der Waals bonding. The coating 106 does not include (is devoid of) a precious metal or an enzyme. As indicated above, the topological insulator exhibits band inversion in the bulk due to strong spin-orbit coupling and includes delocalized, topologically protected states on the surface. Topological insulators may be described as having electrically conducting surface states and an electrically insulating bulk (interior). The topological insulator of the coating 106 may comprise a bismuth and/or antimony chalcogenide having a chemical formula of $Bi_2Se_3$, $Bi_2Te_3$, $Sb_2Te_3$, $Bi_{2-x}Sb_xTe_3$, or $Bi_{2-x}Sb_xSe_3$, where $0 \leq x \leq 2$. A bismuth chalcogenide, in particular, $Bi_2Te_3$, is employed in experiments described below.

Figure 1B:
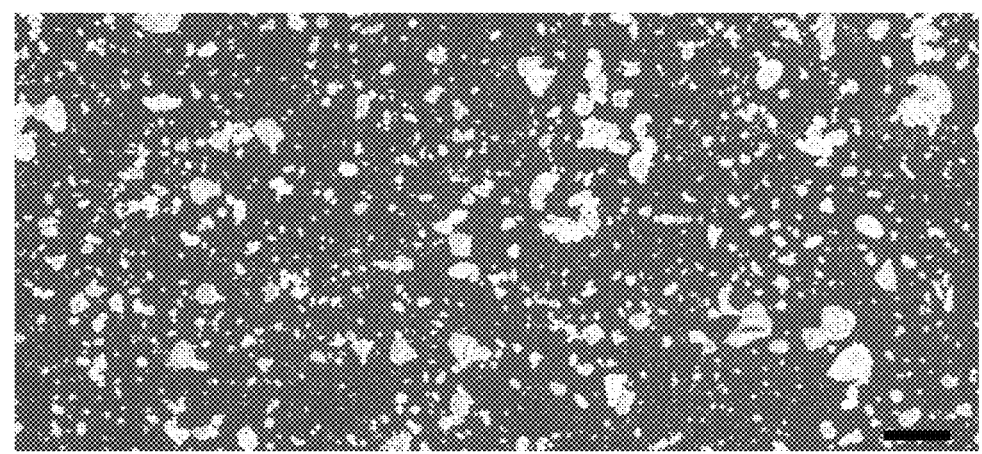
FIG. 1B shows a scanning electron microscopy (SEM) image of synthesized $Bi_2Te_3$ flakes drop-casted onto a substrate; scale bar is 10 microns.
Figure 1C:
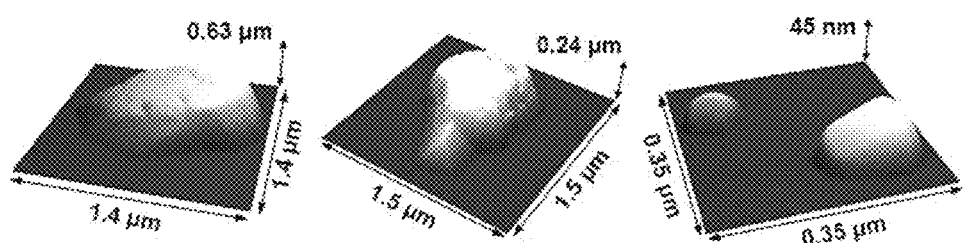
FIG. 1C shows atomic force microscopy (AFM) images of different $Bi_2Te_3$ flakes in 3D view.

Advantageously, the coating 106 on the conductive substrate 104 may be formed from flakes 108 comprising the topological insulator. The flakes 108 may have a desirable crystalline structure as well as a morphology advantageous for sensing. To achieve both high crystalline quality and exposed surfaces, edges, and corners as potential active sites for $H_2O_2$ reduction, a liquid-phase exfoliation method (e.g., sonication) may be employed to produce the flakes 108. As described below, commercially available powders comprising the topological insulator may undergo sonication to form nano- and microscale flakes having lateral dimensions ranging from a few nanometers to a few microns. The flakes 108 may include a homogeneous distribution of the elemental components (e.g., Bi, Te and/or Sb) of the topological insulator and/or a stoichiometric composition of the topological insulator. Electron microscopy and atomic force microscopy investigations reveal that exposed facets of the flakes 108 may have different orientations, crystalline domains, and/or surface roughness. The nanoscale thickness and rich surface structure of the flakes 108 may promote both high conductivity and exposure of various possible active sites, thus facilitating electrochemical sensing. A scanning electron microscope (SEM) image of flakes 108 prepared by drop-casting onto a silicon substrate is shown in FIG. 1B (10 μm scale bar) and atomic force microscopy (AFM) images showing the morphology of different flakes 108 are shown in FIG. 1C.

Figure 2:
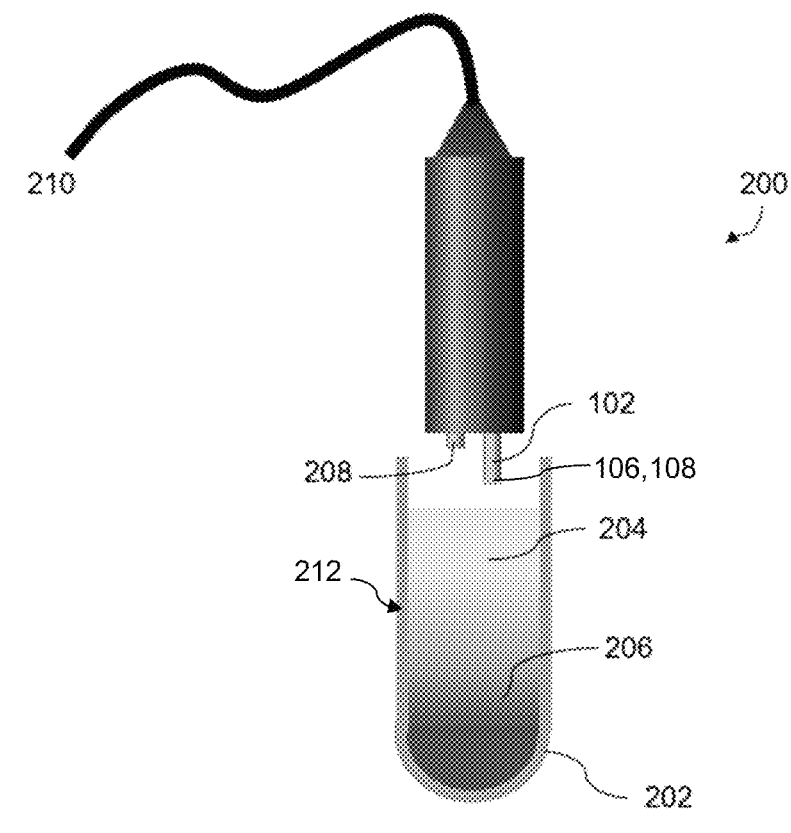
FIG. 2 is a schematic of an electrochemical sensor for in vitro detection of hydrogen peroxide.
Figure 3:
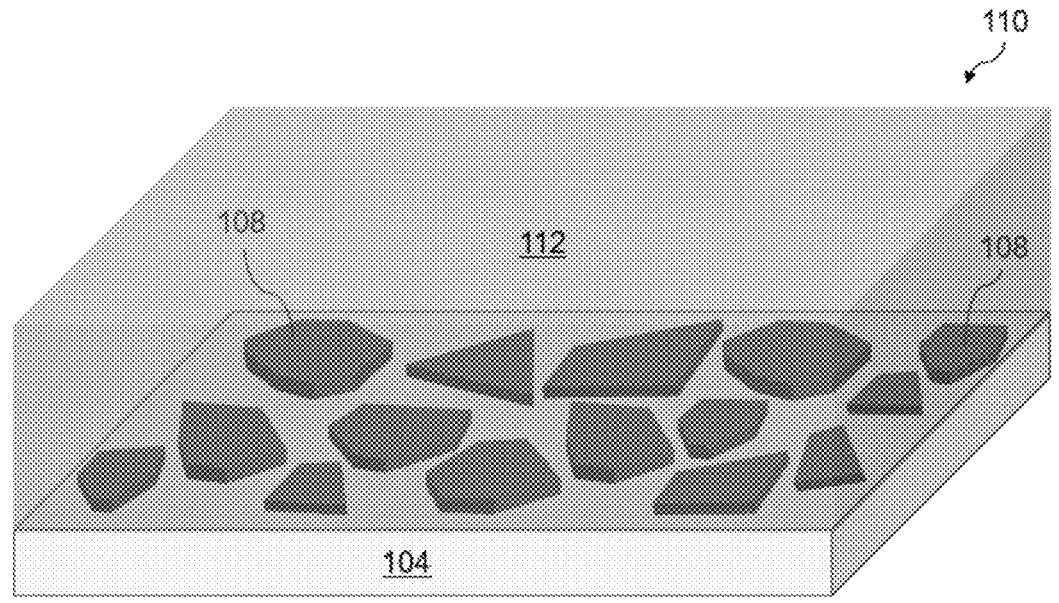
FIG. 3 is a schematic of a solution coating process to form the coated electrode of FIG. 1A.

An electrochemical sensor for in vitro detection of hydrogen peroxide has been developed based on the coated electrode 102, as illustrated in FIG. 2. The electrochemical sensor 200 includes a container 202 for holding an electrolyte 204 and receiving a biological specimen 206. The electrochemical sensor 200 also includes the coated electrode 102 positioned in the container 202, and a counter electrode 208 spaced apart from the coated electrode 102 in the container 202. FIG. 3 shows the electrochemical sensor 200 prior to immersion of the coated electrode 102 and the counter electrode 208 into the electrolyte 204 for use in hydrogen peroxide detection. The coated electrode 102 may have any of the characteristics described in this disclosure and may be fabricated as described below. The coated electrode 102 and the counter electrode 208 are configured for electrical connection 210 to a voltage source and an ammeter. An electrochemical method for in vitro detection of hydrogen peroxide utilizing the electrochemical sensor 200 is discussed below.

To form the coating 106 comprising the topological insulator, which is essential to the coated electrode 102, a coating solution 110 including the flakes 108 may be deposited onto the conductive substrate 104, as illustrated in FIG. 3. In addition to the flakes 108 comprising the topological insulator, the coating solution 110 may include a liquid 112, which is typically water, such as deionized (DI) water. The conductive substrate 104 may be dried to evaporate the liquid 112 while the flakes 108 remain, forming the coating 106, as illustrated in FIG. 1A. In some examples, the coating 106 may directly adhere to the conductive substrate 104. In other examples, the coating 106 may further include an organic binder to promote adhesion (e.g., of the flakes 108) to the conductive substrate 104. To effect drying or evaporation of the liquid in the coating solution 112, the conductive substrate 104 may be exposed to a nitrogen atmosphere after the coating solution is deposited. Drying may be carried out for a time duration from 30 minutes to about 12 hours. Thus, a coated electrode 102 for use in hydrogen peroxide detection may be formed.

Surface coverage of the flakes 108 may be at least about 8%, at least about 20%, at least about 40%, and/or as high as 100% of the conductive substrate, in terms of area. To optimize exposure of surfaces, edges, and corners as potential active sites for $H_2O_2$ reduction, the coating 106 may include no more than three layers of the flakes 108, and in some cases no more than two layers of the flakes 108, or no more than a single layer of the flakes 108. Also or alternatively, a loading level of the topological insulator on the conductive substrate 104 may be at least about 0.005 $mg/cm^2$, or at least about 0.01 $mg/cm^2$. Typically, the loading level is no greater than about 1 $mg/cm^2$, or no greater than about 0.5 $mg/cm^2$.

Deposition of the coating solution 110 onto the conductive substrate 104, as illustrated in FIG. 3, may entail drop casting, spray coating, spin coating, dip coating, or another solution coating technique. The method may further include forming the coating solution 110 prior to deposition on the conductive substrate 104. Powders comprising the topological insulator may be added to the liquid 112 to form a mixture, and the mixture may be sonicated to exfoliate the powders, forming the flakes 108, and dispersing them into the liquid 112. The powders may be dispersed into the liquid at a weight ratio in a range from about 1:500 to about 1:1500, such as 1:1000. Sonication of the mixture may take place for a time duration from about 2 hours to about 48 hours to form the coating solution 110.

Individually, the flakes 108 formed via sonication or another exfoliation method may have a nanoscale thickness. For example, the thickness may be at least about 1 nm, at least about 10 nm, at least about 30 nm, at least about 50 nm, at least about 100 nm, or at least about 200 nm. Typically, the thickness is no greater than about 700 nm, no greater than about 500 nm, no greater than about 300 nm, or no greater than 100 nm.

Individually, the flakes 108 may have a lateral dimension, e.g., length and/or width, that falls within the nanoscale or microscale range. For example, the lateral dimension may be at least about 0.02 micron (20 nm), at least about 0.05 micron (50 nm), at least about 0.1 micron (100 nm), at least about 0.2 micron (200 nm), or at least about 0.5 micron (500 nm). Typically, the lateral dimension is no greater than about 20 microns, no greater than about 10 microns, or no greater than about 5 microns.

The conductive substrate 104 may comprise or be formed from an electrically conductive material which is nonreactive in an aqueous solution. The electrically conductive material may be a metal, an alloy, or carbon. A suitable conductive substrate 104 may include carbon paper, graphite, graphite powder, glassy carbon, carbon particles, carbon black, carbon fibers, carbon nanotubes, and/or carbon fullerenes.

An electrochemical method for detecting hydrogen peroxide may include the electrochemical sensor 200 shown schematically in FIG. 2, once the coated electrode 102 and the counter electrode 208 are immersed in the electrolyte 204. As described above, the electrochemical sensor 200 includes a container 202 holding an electrolyte 204, the coated electrode 102 described above positioned in the container 202, and a counter electrode 208 spaced apart from the coated electrode 102 in the container 202. A voltage or potential is applied to the coated electrode 102 and the counter electrode 208, and a biological specimen (e.g., a blood sample) 206 is added to the electrolyte 204 to form an analyte solution 212. The electrolyte 204 may comprise an aqueous solution, which may in some examples may include a salt species, such as 0.1 M $K_2SO_4$. The method may further include purging the electrolyte 204 with argon gas to remove dissolved oxygen. Also or alternatively, the electrolyte 204 may be stirred and/or the coated electrode 102 may be rotated while the voltage is applied. The voltage applied to the coated and counter electrodes 102, 208 may be in a range from about −0.5 V to about 0.5 V.

Typically, no more than one or two droplets of the biological specimen 206 is/are added to the electrolyte 204. Current density is measured while the voltage is applied before the biological specimen 206 is added and after the analyte solution 212 is formed. An increase in the current density upon forming the analyte solution 212 indicates the presence of hydrogen peroxide in the biological specimen 206. More specifically, the increase in current density may occur due to reduction of hydrogen peroxide catalyzed by the topological insulator on the coated electrode 102, as illustrated in FIG. 1A. For an analyte solution including hydrogen peroxide at a concentration of about 0.1 μM or greater, the increase in current density may be at least about 2.5 μA/cm². The increase may occur rapidly, e.g., within about 5 s, or within about 2 s, of adding the biological specimen 206 to the electrolyte 204. A limit of detection of the electrochemical sensor 200 may be 0.02 μM or less of the hydrogen peroxide. For analyte solutions including hydrogen peroxide at a concentration in a range from 0.016 μM to 65 μM, the sensitivity of the measurement may be in a range from about 2500 μA/mM cm² to 4905 μA/mM cm².

Figure 4A:
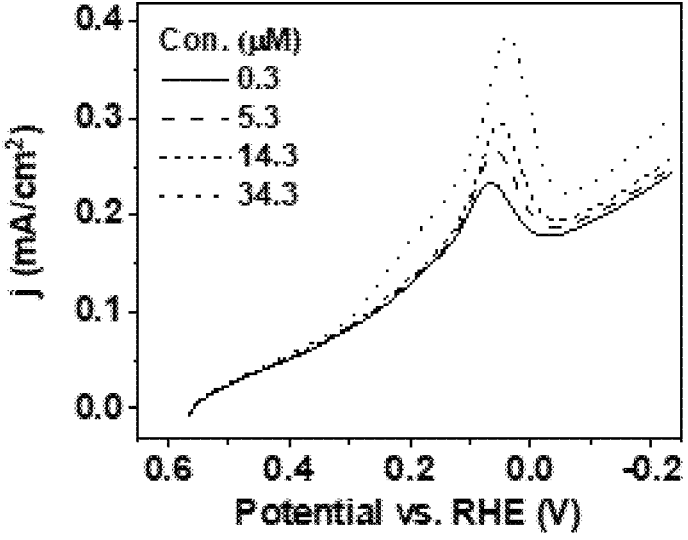
FIG. 4A shows linear sweep voltammetry (LSV) curves at different $H_2O_2$ concentrations (from 0.3 to 34.3 μM), obtained at a scan rate of 5 mV/s.
Figure 4B:
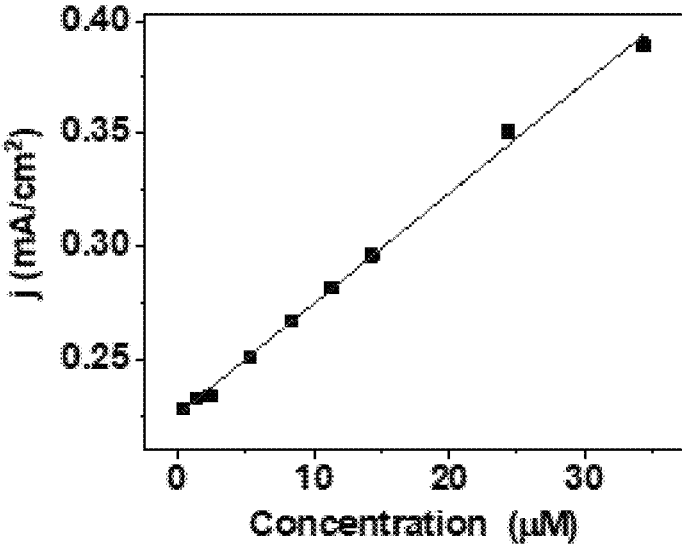
FIG. 4B shows current density as a function of $H_2O_2$ concentration. The square dots and the line show the raw data and linear fit, respectively
Figure 4C:
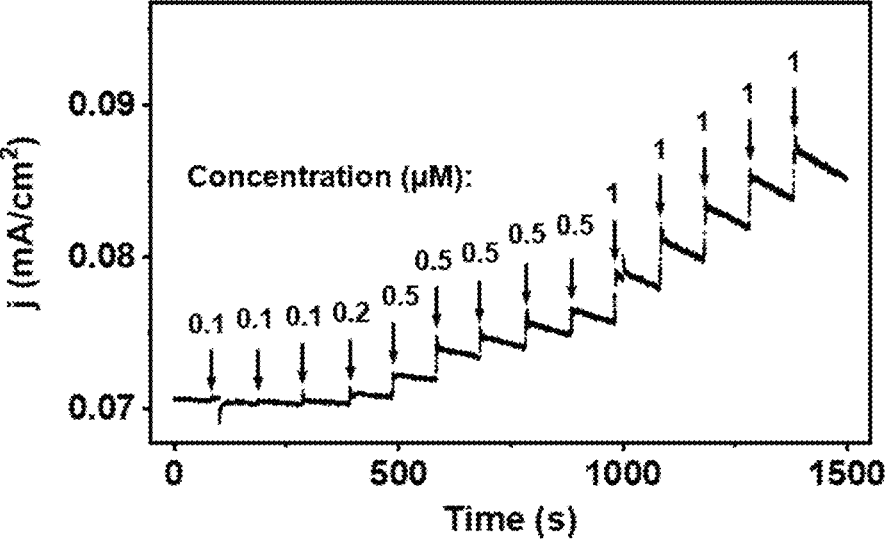
FIG. 4C shows chronoamperometry (CA) response upon adding different amount of $H_2O_2$, at a potential of 0.022 V vs RHE.
Figure 4D:
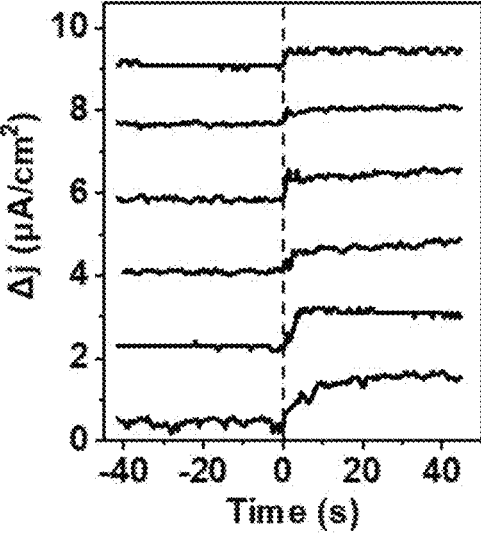
FIG. 4D shows an expanded view of the step increase in current density when 0.1 μM $H_2O_2$ was added to different batches of sensor devices. The addition of $H_2O_2$ occurred at time=0 s.
Figure 4E:
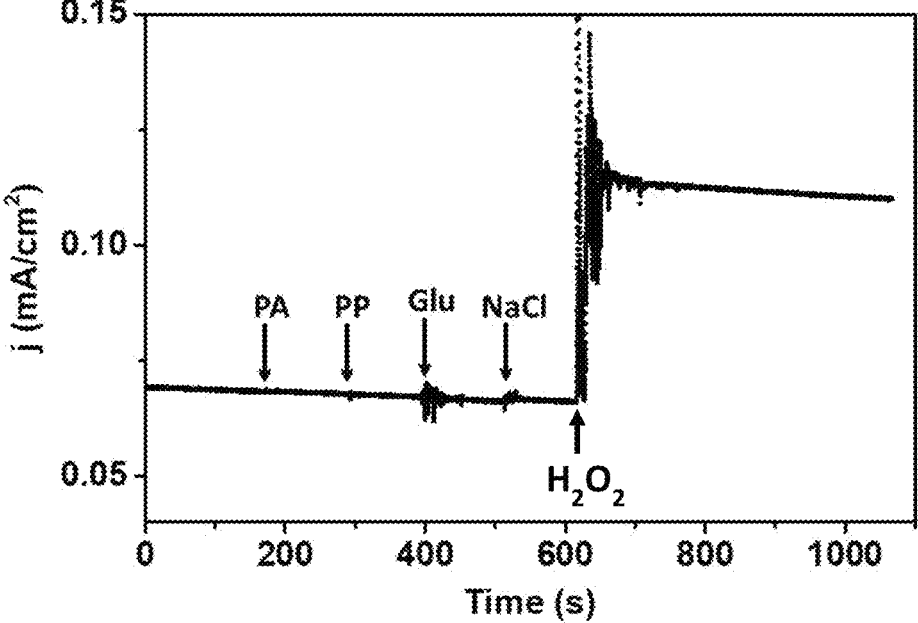
FIG. 4E shows results of selectivity testing of an exemplary $Bi_2Te_3$-based electrochemical sensor.

The electrochemical sensor performance was tested experimentally using a standard three-electrode electrochemical cell. The working electrode in this example included flakes of $Bi_2Te_3$ deposited on a glassy carbon electrode, as described below in the Methods section. First, linear sweep voltammetry (LSV) curves were obtained at different $H_2O_2$ concentrations from 0.3 μM to more than 30 μM. As shown in FIG. 4A, clear reduction peaks are observed in all the curves, with a peak position between 0 V and 0.1 V versus reversible hydrogen electrode (RHE). At a concentration higher than about 20 μM, a second peak emerges around 0.2 V versus RHE, which is likely due to the reduction of oxygen produced by $H_2O_2$ decomposition. Of particular interest is the main $H_2O_2$ reduction peak at ~0.05 V. Peak current density versus concentration shows a linear dependence in FIG. 4B, revealing a sensitivity of ~4903 μA mM⁻¹ cm⁻² and a linear response throughout the measured range. To quantify the limit of detection (LOD), the chronoamperometry (CA) response of the sensor was measured upon adding small drops of $H_2O_2$ solutions at a fixed potential of 0.022 V versus RHE, which is close to the reduction peaks in the measured concentration range. As shown in FIG. 4C, the device shows clear step increases of current density when 0.1 μM $H_2O_2$ was added, and the step height becomes larger when the amount of added $H_2O_2$ increases. Tests on different batches of sensors show similar responses upon the addition of 0.1 μM $H_2O_2$ (see FIG. 4D), revealing the reproducibility of these devices. Based on the CA results of different batches of samples, the change of current density was plotted as a function of $H_2O_2$ concentration a linear response was obtained down to 0.1 μM. From the signal to noise (S/N) ratio of the step response, it was possible to extract a LOD of 0.016 μM corresponding to S/N=3. FIG. 4D shows that the response time of the sensor is typically within 2 seconds, which is mainly limited by the speed of mixing of the added $H_2O_2$ solution droplet with the existing electrolyte, rather than an intrinsic response time of the sensor. FIG. 4E shows results of selectivity tests of the sensor. For each chemical species, 10 μM was added at the marked time, where PA represents potassium ascorbate, PP represents potassium phosphate (a mixture of $KH_2PO_4$ and $K_2HPO_4$, with pH=6.8), Glu represents glucose, and NaCl represents sodium chloride. Note the significant spike in current density with the addition of (only) $H_2O_2$.

LSV measurements of several different batches of sensor devices show similar performance. All of the $Bi_2Te_3$ sensors exhibit a linear response over the full tested range of 0.1-60 μM, and the actual linear range of the devices is likely larger. As summarized in Table 1, the sensitivity and LOD of the sensors are both among the best in all the reported devices. In addition, both the materials and processing conditions of the demonstrated sensors are of low cost. Therefore, the demonstrated $Bi_2Te_3$ electrochemical sensors are believed to be promising devices for biosensing and clinical diagnosis applications.

TABLE 1

Comparison of the performance of various reported $H_2O_2$ sensors with the $Bi_2Te_3$ electrochemical sensors demonstrated in this work.

| Material | Sensitivity (μA mM⁻¹ cm⁻²) | Limit of Detection (LCD) (μM) |
|---|---|---|
| CoO—CoS/NF | 0.059 | 0.89 |
| NiCo₂O₄ NSs | 303.42 | 0.596 |
| Au NPs/Cu-MOF | 1710 | 1.2 |
| Ag@MOF/GO | 80.23 | 0.18 |
| IE-MoS₂ | 1706 | 0.2 |
| ZnO/Co₃O₄/NiCo₂O₄ | 388 | 0.163 |
| PtNi/MWCNT | 2123.1 | 0.06 |
| CoOₓ NPs/cholesterol oxidase | 43.5 | 4.2 |
| Bi₂Te₃ | 4903 | 0.016 |

Kinetic Analysis

Previous studies of electrocatalysis using topological materials have used density functional theory (DFT) to calculate the electronic structure and adsorption energy, and attributed the high catalytic activity to coupling of atomic active sites with the topological surface states which can lead to favorable binding energies of the reactants. While these thermodynamic properties are in general relevant to all types of electrochemical reactions, for sensing applications the reaction kinetics is more critical, which directly impacts the magnitude of electrochemical current—the sensed signal in response to an analyte—at an optimized applied potential. To achieve sensitive detection of trace amounts of chemical species, it is important to have facile interfacial charge transfer, in order to generate a large redox current. However, previous work on $H_2O_2$ electrochemical sensors have rarely reported analysis of the charge transfer rate constants.

Therefore, a microkinetic analysis of our $Bi_2Te_3$-based electrochemical sensors may be both complementary to previous DFT simulations on the atomistic thermodynamics of the catalytic reactions, and may shed light on the kinetics of the interfacial charge transfer processes.

Figure 5A:
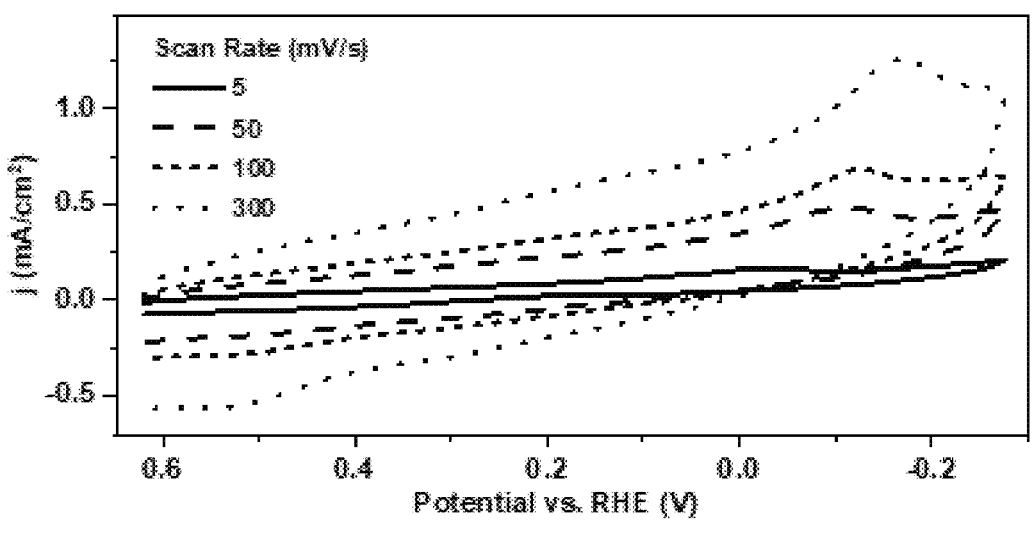
FIG. 5A shows cyclic voltammetry (CV) curves at different scan rates, with a $H_2O_2$ concentration of 81 μM.
Figure 5B:
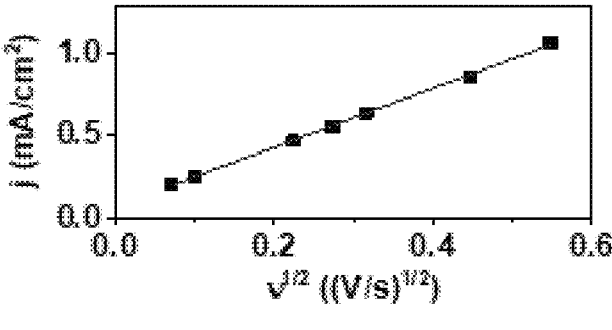
FIG. 5B shows cathodic peak current as a function of the square root of scan rate, including the raw data and linear fit.
Figure 5C:
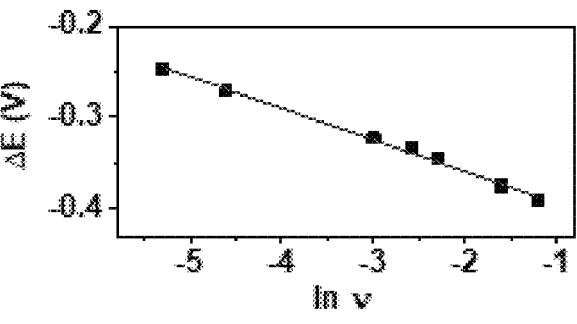
FIG. 5C shows linear regression of the cathodic peak position (relative to the half-wave potential) as a function of the natural logarithm of scan rate (with a unit of V/s).

To enable a thorough kinetic analysis, cyclic voltammetry (CV) was performed at different scan rates. As shown in FIG. 5A, both cathodic (<0 V) and anodic peaks (>0.4 V) are observed. These CV results reveal that the $H_2O_2$ reduction reaction is in the quasi-reversible regime, due to 1) the large anodic and cathodic peak separation and 2) the shift of peak position at different scan rates. To quantify the kinetic parameters of $H_2O_2$ reduction, the peak current density and peak potential are extracted as a function of the scan rate (v), as shown in FIGS. 5B and 5C. The linear dependence of the peak current as a function of $v^{1/2}$ indicates that the reaction is diffusion limited at sufficiently negative potential. The peak potential changes roughly linearly as a function of ln v, which is also expected for a quasireversible reaction as long as the scan rate is not too small. It is assumed that the reaction proceeds via a two-electron reduction of $H_2O_2$:

$$H_2O_2 + 2H^+ + 2e^- \rightarrow 2H_2O$$

To extract the standard rate constant, the following kinetic equation for the quasi-reversible reactions is used:

$$\Delta E = E_p - E_{1/2} = -\Xi(\Lambda, \alpha)\left(\frac{RT}{F}\right)$$

where $E_p$ is the peak potential, $E_{1/2}$ is the half-wave potential (middle of the anodic and cathodic peaks), R is the ideal gas constant, T=298 K is the temperature, and F is the Faraday constant. In addition, $\Lambda$ is determined by $$\Lambda = \frac{k^0}{\left(D_O^{1-\alpha} D_R^\alpha fv\right)^{1/2}},$$

where $k^0$ is the standard rate constant of the reaction, $D_O = 1.2 \times 10^{-9}$ m²/s and $D_R = 2.3 \times 10^{-9}$ m²/s are the diffusion coefficients of $H_2O_2$ and $H_2O$ molecules, respectively, and f=F/RT. The transfer coefficient $\alpha$ can be determined from the ratio of the Tafel slope of the measured cathodic ($Slope_c$) and anodic ($Slope_a$) waves:

$$\frac{Slope_c}{Slope_a} = \frac{-\alpha}{1-\alpha}.$$

$\alpha = 0.51$ is obtained. $\Xi$ is a parameter that has a fixed dependence on $\Lambda$ and $\alpha$. Substituting the experimental data and standard parameters into these formulas, one obtains $k^0 \approx 3 \times 10^{-5}$ cm/s. Note that $k^0$ is the rate constant at the half-wave potential. At other cathodic potentials (E), the reaction rate constant is $k = k^0 e^{-\alpha f(E-E_{1/2})}$. For example, at a scan rate of 5 mV/s, the cathodic peak potential occurs at $\Delta E = E_p - E_{1/2} \approx -0.25$ V, and the corresponding rate constant is $k \approx 4.3 \times 10^{-3}$ cm/s.

The kinetic parameters can also be determined independently from electrochemical impedance spectroscopy (EIS).

Figure 5D:
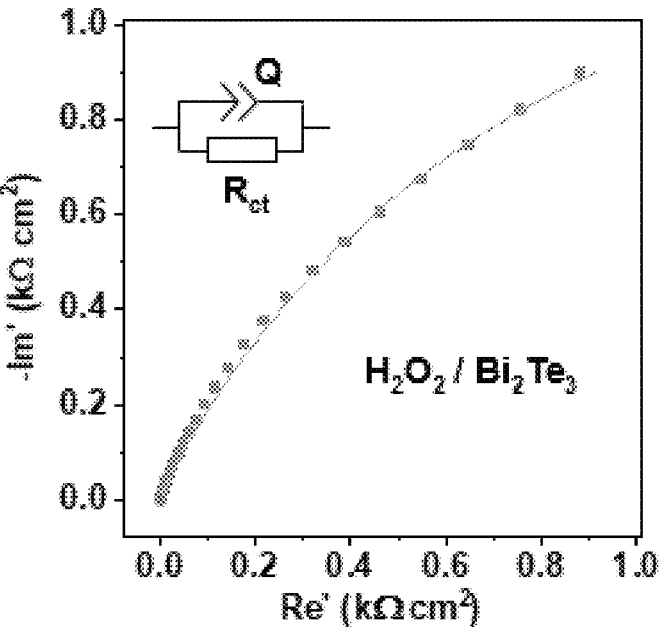

Assuming that the kinetics follows the Butler-Volmer model, at cathodic potentials $$k = \frac{RT}{\alpha n F^2 C R_{ct}}$$

is obtained, where $R_{ct}$ is the charge transfer resistance, n=2 is the charge transfer number, and C is the initial concentration of $H_2O_2$. EIS measurements were performed at C=100 μM and E=0.066 V, and the Nyquist plot shown in FIG. 5D was obtained. Using a RQ (Parallel resistance and constant-phase element) circuit model, the EIS spectrum is fit and $R_{ct} = 3.3$ kΩcm² is obtained. Therefore, the rate constant can be obtained as $k = 7.9 \times 10^{-4}$ cm/s. The standard rate constant is thus $k^0 = k e^{\alpha f(E-E_{1/2})} = 3.6 \times 10^{-5}$ cm/s. It can be seen that the $k^0$ values obtained using these two methods are similar, confirming the validity of the kinetic analysis algorithms.

Figure 5E:
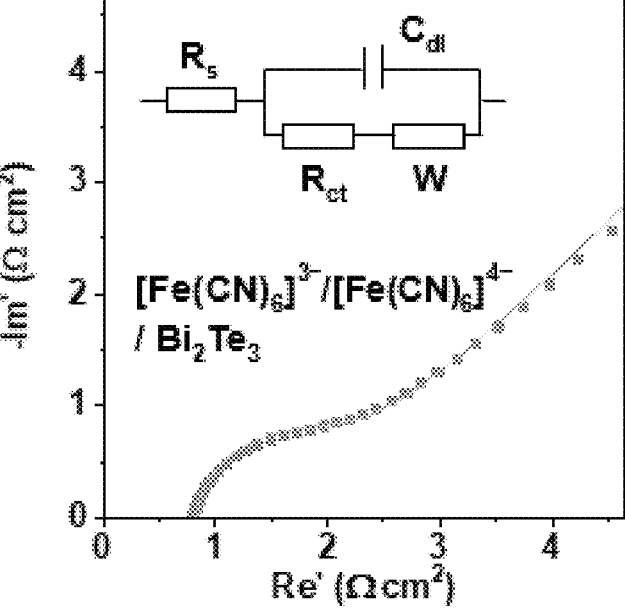
FIG. 5E shows EIS result of 5.0 mM $K_3Fe(CN)_6$ and 5.0 mM $K_4Fe(CN)_6$ in an aqueous solution containing 0.1 M $K_2SO_4$, at the standard potential of 0.764 V vs RHE; the obtained values of the equivalent circuit elements are $R_{ct}$=1.2 $Ωcm^2$, solution resistance $R_s$=0.83 $Ωcm^2$, double layer capacitance $C_{dl}$=188.7 μF/$cm^2$ and Warburg coefficient σ=19.1 $ΩS^{-1/2}$ $cm^2$.

Since the kinetic parameters of $H_2O_2$ reduction have rarely been reported in existing literature on electrochemical sensors, a standard redox couple, ferricyanide/ferrocyanide (5 mM each in 0.1 M $K_2SO_4$ solution), is used as a medium to compare the charge transfer resistance of the $Bi_2Te_3$ catalyst with other reported catalysts for $H_2O_2$ sensing. EIS of this redox couple is performed, and the Nyquist plot is extracted, as shown in FIG. 5E. Using a Randles equivalent circuit model, an $R_{ct}$ of 1.2 Ωcm² is obtained. This is smaller than other catalyst materials typically used for $H_2O_2$ sensing (measured using the same redox couple), such as noble metal nanostructures, 2D materials and heterostructures, and oxide nanomaterials. This result reveals that the $Bi_2Te_3$ catalysts have intrinsically facile interfacial charge transfer kinetics, which may be due to wave function delocalization of the topological surface states.

Figure 6A:
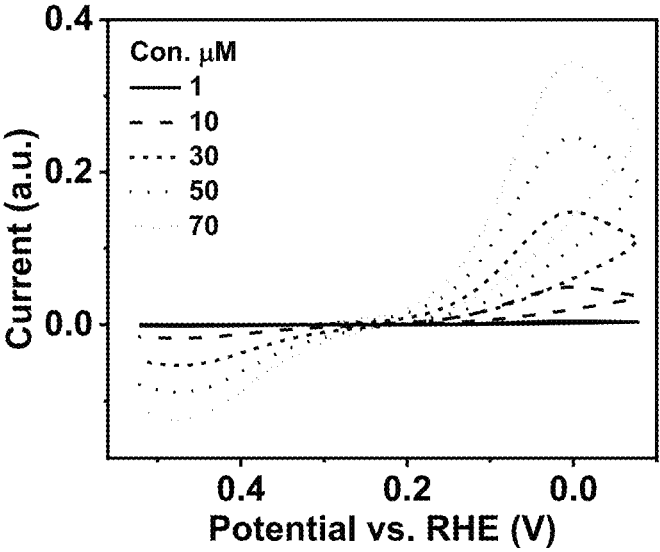
FIG. 6A shows CV at different $H_2O_2$ concentrations and a scan rate of 5 mV/s.
Figure 6B:
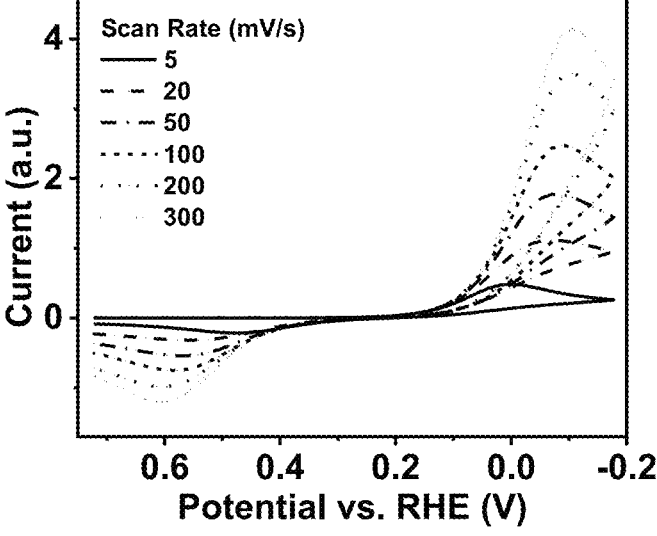
FIG. 6B shows CV at different scan rates, with a $H_2O_2$ concentration of 1 μM.

To further verify the kinetic parameters and understand the reaction mechanism, microkinetics simulations based on the Butler-Volmer model were performed, as described in the Methods section below. Using the parameters extracted from experimental data, CV curves were simulated at a series of different $H_2O_2$ concentration and scan rate parameters, as shown in FIGS. 6A and 6B. Except for double layer capacitance and solution resistance effects that are not included in the simulation, the main features of the simulated CV curves are consistent with the experimental results, including the position, separation and asymmetry of the cathodic and anodic peaks, and the dependence of the peak intensity on $H_2O_2$ concentration and scan rate. This agreement reveals that the reactions are indeed quasireversible and can be reasonably explained using the classical kinetics model. While this model does not contain the atomistic details of the interfacial charge transfer processes, it offers a general framework for understanding the electrochemical sensing properties based on the inherently sluggish redox reactions, such as the reduction of oxygen and $H_2O_2$.

In conclusion, an ultrasensitive electrochemical sensor for $H_2O_2$ detection using nanostructured topological insulators has been demonstrated. Through microkinetic analysis and simulations, it has been found that facile interfacial charge transfer is likely the key factor leading to high sensitivity. Topological materials are therefore expected to be suitable for use in a wide variety of chemical and bio-sensors.

Methods

Materials Synthesis and Electrode Preparation. Commercial $Bi_2Te_3$ powders purchased from Sigma Aldrich were dispersed in DI water with 1:1000 weight ratio. The mixture solution was then ultrasonicated in a Branson sonicator (M2800) for 24 hours, and stored as stock solution. To prepare each working electrode, 10 μL sonicated solution was drop-casted onto a glassy carbon disk electrode (Pine E5TQ) and then dried in $N_2$ atmosphere overnight. The geometric surface area of the electrode is 0.196 cm$^2$, and the surface coverage is estimated to be 7.9% from direct SEM imaging of the glassy carbon electrodes in multiple areas. As a result, an electrochemical surface area of ~0.0155 cm$^2$ is estimated.

Electron Microscopy Characterization. For SEM, samples were prepared by drop casting $Bi_2Te_3$ flakes on Si substrates or glassy carbon electrode inserts, and imaged using Hitachi S4700 and S4800 SEM. EDS mappings were obtained with using an IXRF system integrated to the Hitachi S4700 SEM. For TEM, samples were prepared by drop casting $Bi_2Te_3$ flakes on a Cu TEM grid, and then imaged using a JEOL 2100 Cryo TEM with a $LaB_6$ emitter at 200 kV.

Atomic Force Microscopy Characterization. AFM measurements were performed using a Cypher ES AFM (Asylum Research, Oxford Instruments). Tap 300 AI-G probes purchased from Budget Sensors were used for AC mode imaging. Imaging parameters were optimized to ensure that repulsive mode was reached, so that the obtained height profiles of the flakes are accurate.

Electrochemical Measurements. LSV, CV, CA and EIS measurements were carried out using a standard three-electrode setup with one glassy carbon working electrode (Pine E5TQ), one Ag/AgCl reference electrode (BASi MF-2052) and one Pt counter electrode (CHI 115). The electrolyte was aqueous solutions of 0.1 M $K_2SO_4$. To eliminate the dissolved oxygen in the solution, the electrolyte was purged using ultrapure argon for at least 5 hours before the electrochemical measurements, and continuously purged argon throughout all the electrochemical tests. LSV and CV were carried out using a CHI 600E potentiostat (CH Instruments). EIS was measured using either a CHI 760 potentiostat from CH Instruments or a VSP potentiostat from BioLogic. The electrolyte used in EIS measurements was either 100 µM $H_2O_2$ in 0.1 M $K_2SO_4$, or a mixture of 5.0 mM $K_3Fe(CN)_6$ and 5.0 mM $K_4Fe(CN)_6$ dissolved in 0.1 M $K_2SO_4$ solution. All the electrochemical measurements were carried out with either no electrode rotation, or with a rotation speed of 200 rpm. When the electrode was not rotated, a magnetic stir bar was used with stirring rate of 800 rpm.

Kinetic Simulation. The simulation of CV curves follows the finite difference method proposed by Dieter Britz. Mass transfer is determined by Fick's law and the reaction current is determined by Butler-Volmer equation. The input parameters are the rate constant, charge transfer coefficient, scan rate, and initial concentration of $H_2O_2$, all of which are the same as or close to the experimental values.

Although the present invention has been described in considerable detail with reference to certain embodiments thereof, other embodiments are possible without departing from the present invention. The spirit and scope of the appended claims should not be limited, therefore, to the description of the preferred embodiments contained herein. All embodiments that come within the meaning of the claims, either literally or by equivalence, are intended to be embraced therein.

Furthermore, the advantages described above are not necessarily the only advantages of the invention, and it is not necessarily expected that all of the described advantages will be achieved with every embodiment of the invention.

The invention claimed is:

1. An electrochemical method for detecting hydrogen peroxide, the method comprising:
   providing an electrochemical sensor comprising:
      a container holding an electrolyte;
      a coated electrode positioned in the container, the coated electrode comprising: a conductive substrate; and a coating comprising flakes dispersed over the conductive substrate, the flakes having a lateral dimension larger than a thickness thereof and comprising a topological insulator comprising a bismuth and/or antimony chalcogenide having a chemical formula of $Bi_2Se_3$, $Bi_2Te_3$, $Sb_2Te_3$, $Sb_2Se_3$, $Bi_{2-x}Sb_xTe_3$, or $Bi_{2-x}Sb_xSe_3$, wherein 0<x<2 and the flakes comprise exposed facets having different crystalline domains and/or surface roughness; and
      a counter electrode spaced apart from the coated electrode in the container,
   applying a voltage to the coated electrode and the counter electrode;
   adding a biological specimen to the electrolyte to form an analyte solution; and
   measuring current density, wherein an increase in the current density upon forming the analyte solution indicates presence of hydrogen peroxide in the biological specimen,
   wherein the electrochemical sensor has a limit of detection of 0.02 µM or less of the hydrogen peroxide.

2. The electrochemical method of claim 1, wherein the increase in the current density occurs due to reduction of the hydrogen peroxide catalyzed by the topological insulator.

3. The electrochemical method of claim 1, wherein, for the analyte solution including hydrogen peroxide at a concentration of about 0.1 µM or greater, the increase in current density is at least 2.5 µA/cm$^2$.

4. The electrochemical method of claim 1, wherein the increase in the current density occurs within about 5 s of adding the biological specimen to the electrolyte.

5. The electrochemical method of claim 1, wherein the biological specimen comprises a blood sample.

6. The electrochemical method of claim 1, wherein no more than two droplets of the biological specimen are added to the electrolyte.

7. The electrochemical method of claim 1, wherein the electrolyte comprises an aqueous solution.

8. The electrochemical method of claim 1, wherein the coating does not include a precious metal or an enzyme.

9. The electrochemical method of claim 1, wherein the topological insulator is crystalline.

10. The electrochemical method of claim 1, wherein surface coverage of the flakes is at least about 8% of the conductive substrate.

11. The electrochemical method of claim 1, wherein the coating includes no more than three layers of the flakes.

12. The electrochemical method of claim 1, wherein a loading level of the topological insulator on the conductive substrate is in a range from 0.005 mg/cm$^2$ to 1 mg/cm$^2$.

13. The electrochemical method of claim 1, wherein, for the analyte solution including hydrogen peroxide at a concentration in a range from 0.016 µM to 65 µM, a sensitivity of the measurement of current density is in a range from about 2500 µA/mM cm$^2$ to 4905 µA/mM cm$^2$.

14. An electrochemical method for detecting hydrogen peroxide, the method comprising:

providing an electrochemical sensor comprising:

a container holding an electrolyte;

a coated electrode positioned in the container, the coated electrode comprising: a conductive substrate; and a coating comprising flakes dispersed over the conductive substrate, the flakes having a lateral dimension larger than a thickness thereof and comprising a topological insulator comprising a bismuth and/or antimony chalcogenide having a chemical formula of $Bi_2Se_3$, $Bi_2Te_3$, $Sb_2Te_3$, $Sb_2Se_3$, $Bi_{2-x}Sb_xTe_3$, or $Bi_{2-x}Sb_xSe_3$, wherein $0<x<2$ and the flakes comprise exposed facets having different crystalline domains and/or surface roughness; and a counter electrode spaced apart from the coated electrode in the container, applying a voltage to the coated electrode and the counter electrode;

adding a biological specimen to the electrolyte to form an analyte solution; and measuring current density, wherein an increase in the current density upon forming the analyte solution indicates presence of hydrogen peroxide in the biological specimen, wherein, for the analyte solution including hydrogen peroxide at a concentration in a range from 0.02 µM to 65 µM, a sensitivity of the measurement of current density is in a range from about 2500 µA/mM cm$^2$ to 4905 µA/mM cm$^2$.

* * * * *